April 15, 1941.  H. J. MURRAY, JR  2,238,394
SIGNAL SYSTEM FOR VEHICLES
Filed June 11, 1938  2 Sheets-Sheet 2
Fig. 3
Fig. 2
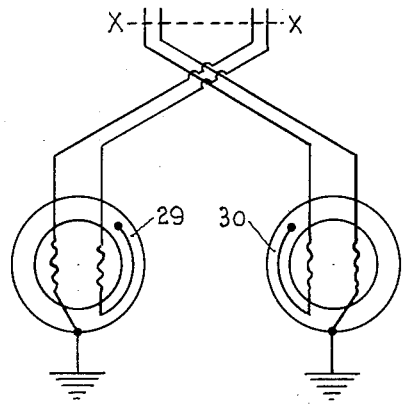
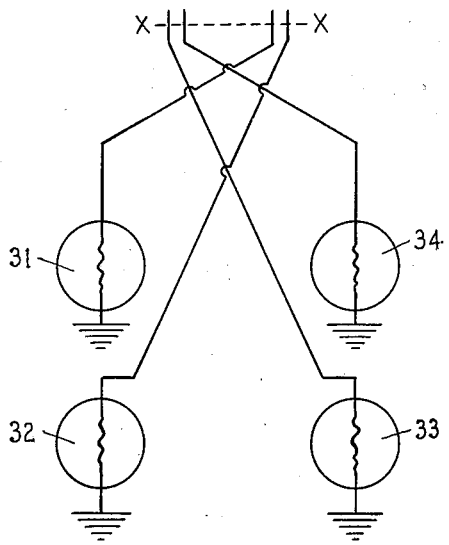
Fig. 4
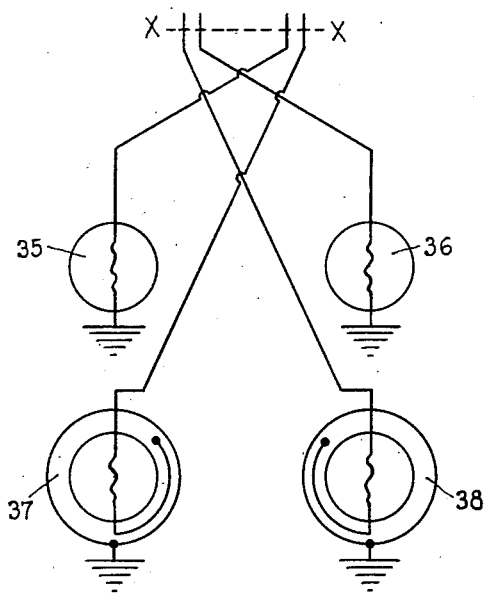
INVENTOR
Howard J. Murray Jr.

Patented Apr. 15, 1941

2,238,394

UNITED STATES PATENT OFFICE 2,238,394

SIGNAL SYSTEM FOR VEHICLES

Howard J. Murray, Jr., New York, N.Y.

Application June 11, 1938, Serial No 213,179

10 Claims. (Cl. 177—337)

The present invention relates to apparatus for signalling, and especially that type of signalling by which the operator of a vehicle equipped with braking and steering means may indicate certain of his intentions to persons exterior of the vehicle.

This is a continuation of application Serial Number 62,307 filed February 4, 1936, as to all common subject matter.

One object of the invention is to provide two pairs of light sources so mounted on a vehicle that they may singly or in combination provide the following indications to persons exterior of the vehicle—

1. The presence of vehicle (tail light).
2. The intent of the operator to suddenly decrease the rate of motion of the vehicle (stop light).
3. The intent of the operator to change the direction of horizontal motion of the vehicle (direction signal light).
4. Indication 1 plus indication 3 concurrently.
5. Indication 2 plus indication 3 concurrently.

Another object of the invention is to provide a direction signal light which will be intermittently energized, and to provide, when necessary, a reference light for this direction signal light, so that during periods of poor visibility an observer will know that an intermittent light appearing to the right of a constantly energized light indicates an intent of the warning operator to turn his vehicle to the right. Correspondingly, an observer seeing an intermittently energized light on the left of a steady light will know that the operator of the vehicle on which the lights are located intends to turn to the left.

In one embodiment the invention has as an object the employment of two double-filament electric lamps, whereby one lamp may flash as a direction signal while the other lamp operates concurrently as a constantly energized tail or stop signal. Since this constantly energized lamp is performing the function of a reference light simultaneously with its function as a tail or stop signal, it will be seen that each double-filament lamp (or two single-filament lamps, as desired) will selectively perform four functions— direction, tail, stop and reference functions— at the will of the vehicle operator.

It will also be seen that, in one embodiment of the invention, a double-filament lamp is employed in a quadruple capacity, and one of the filaments thereof in a triple capacity. Obviously the filaments may be placed in separate bulbs without in any way affecting the signals given.

Various other objects and advantages of the invention will be apparent from an inspection of the accompanying drawings.

In the drawings:

Figure 2 shows a portion of Figure 1 with the double-filament lamps each equipped with an integral thermostatic current interrupting element in series with the direction signal filament.

Figure 3 shows a portion of Figure 1 with the filaments each enclosed in a separate bulb.

Figure 4 shows a modification of Figure 2 with the filaments each enclosed in a separate bulb.

Figure 1:
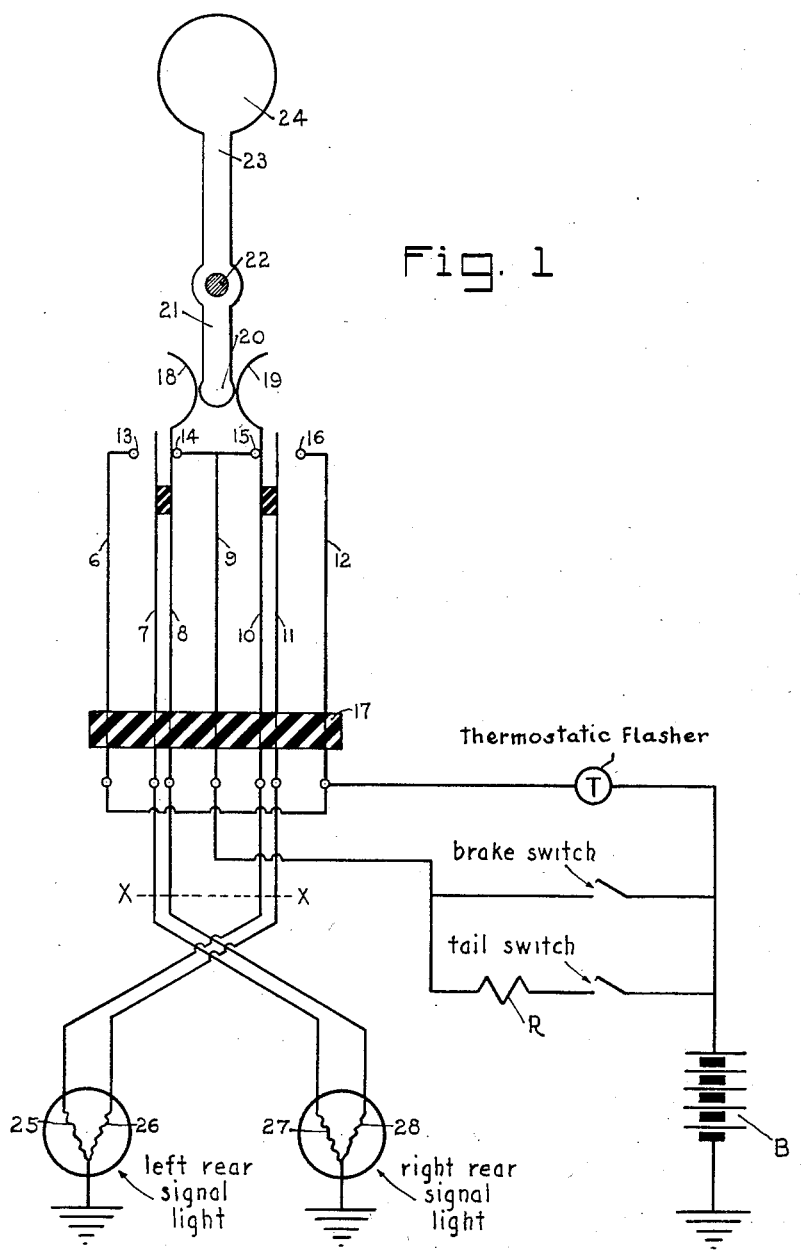
Figure 1 is largely a diagrammatic presentation of means embodying a preferred form of the present invention.

In the accompanying drawings the electrical parts are shown symbolically together with the mechanical parts and connections, but the showing is merely suggestive and must be modified to meet the particular requirements of the different makes of vehicles upon which the system is to be installed. Throughout the specification the same letters or numbers refer to similar elements.

It is intended that the "light sources" referred to herein be so mounted on a vehicle that, when energized, the light emitted therefrom will be visible to persons exterior of the vehicle and at the rear thereof.

In Figure 1 a number of conventional elements are shown which are at present found on automotive vehicles. These include a battery or source of current B, a normally open brake pedal operated switch, and a tail signal control switch. For convenience these two switches will hereinafter be referred to as the "brake" and "tail" switches. Also shown is a pair of conventional double-filament electric lamps constituting right and left rear signal lights as illustrated.

In addition, Figure 1 shows a current limiting resistance R, and a current interrupting circuit element T. This element T is preferably of the thermostatic type, but may be motor driven or any other form known in the art. It is intended to operate at a pre-determined frequency.

The two double-filament lamps mentioned above contain the filaments 25 and 26, 27 and 28, respectively, as shown.

In addition, Figure 1 illustrates a direction signal control switch designed for selective manual actuation. This switch consists of seven flexible spring elements 6 thru 12, positioned in fixed spaced relation in the insulating support 17. Switch elements 7 and 8 are insulated from each other as shown, and are designed to have a common movement when caused to depart from their neutral position, as will hereinafter be described. Switch elements 10 and 11 have a relation similar to that of elements 7 and 8.

Switch element 6 is provided with a contact 13. Element 12 is provided with a contact 16. Element 9 is provided with two contacts 14 and 15. Elements 8 and 10 are each provided with a curved extension portion 18 and 19 respectively.

The direction signal control switch is intended to be manually actuated by the operator of the vehicle upon which the device is installed. For this purpose is provided a handle 24 attached to a lever 23 pivoted at 22 in a conventional manner. This pivot 22 is supported by some rigid part of the vehicle, which supporting means are not shown. Another lever 21 forming in effect an extension of the lever 23 is also pivoted at 22 and has on its lower end an actuator 20, this actuator being so positioned as to selectively actuate the curved extension portions 18 and 19 when the handle 24 is manipulated by the vehicle operator.

The position of the elements of the direction signal control switch as shown in Figure 1 constitutes the "neutral position" of the switch. As such, the elements 8 and 14 are in electrical contacting relation, elements 10 and 15 are also in electrical contacting relation, elements 7 and 13 are out of electrical contacting relation, and elements 11 and 16 are also out of electrical contacting relation.

The "left rear signal light" and the "right rear signal light" shown in Figure 1 are intended to be located on relatively opposite sides of a vehicle, considered horizontally in the conventional manner. This positioning applies as well to the employment of other light sources, that is, four light sources will be arranged in pairs with one pair on the left side of a vehicle and the remaining pair on the right side, all of these sources being visible when energized from the rear of the vehicle.

The handle 24 is intended to be so positioned as to be within convenient reach of the operator of the vehicle, preferably at some point near the rim of the conventional steering wheel.

Figure 2 shows the filaments 25 and 26 of Figure 1 enclosed in a bulb 29, and the filaments 27 and 28 of Figure 1 enclosed in a bulb 30. Each of these bulbs is provided with an integral current interrupting element in series with the direction signal filament as illustrated. The idea of a current interrupter designed to form an integral part of a signal light is well known in the art, one example being shown in Patent Number 1,998,823 to Schmidinger et al.

Figure 3 shows the four filaments of Figure 1 in separate bulbs, filament 25 in bulb 31, filament 26 in bulb 32, filament 27 in bulb 33, and filament 28 in bulb 34.

Figure 4 shows a modification of Figure 2 in which the four filaments of the latter figure are placed in individual bulbs 35, 36, 37 and 38, the two bulbs containing the direction signal filaments having the thermostatic feature mentioned above for Figure 2.

The dotted line x—x of Figures 1 thru 4 cuts through the same elements, and is intended to show the relationship of the four figures.

When the modifications shown in Figures 2 and 4 are employed, the current interrupter T of Figure 1 is, of course, omitted from the circuit, and the leads to this element joined together.

The position of the direction signal control switch as shown in Figure 1 is, as stated above, its "neutral position." When the operator of the vehicle desires to indicate his intention of changing its direction of motion, he will actuate the control handle 24. For a right turn, this actuation will be to the right; for a left turn, to the left. If the former be the case, the actuation of the handle 24 to the right will move the actuator 20 to the left, moving the curved extension portion 18 to the left, moving the element 8 out of contact with the element 14, and moving the element 7 into electrical contacting relation with the element 13. If the operator had instead actuated the handle 24 to the left, the actuator 20 would have been moved to the right, the curved extension portion 19 moved to the right, the element 10 moved out of contacting relation with the element 15, and the element 11 moved into contacting relation with the element 16. When either of the extension portions 18 and 19 is moved by the actuator 20 as described above, the other extension portion remains undisturbed, and the "neutral" contacting relations of its associated elements are not altered.

The operation of the circuit shown in Figure 1 will now be apparent, as it is only necessary to assume a closing of the three circuit controls and trace the resulting flow of current.

It may be said, however, that the filaments 25 and 28 are the "stop-tail" filaments, and the filaments 26 and 27 the "direction signal" filaments. The filaments 25 and 28 are preferably so designed that when energized by the full strength of the battery B they will have an illumination of conventional "stop light signal intensity." The resistance R is preferably chosen so as to reduce this illumination to conventional "tail light signal intensity." The only absolute requirement, however, is that the two intensities be distinguishable from each other.

The two filaments 26 and 27 may be of any suitable capacity. It may be found in actual practice, however, that if a flashing direction signal light of sufficient brightness to be visible in bright sunlight is chosen, this light may be too intense at night. Conversely, if the light is of correct intensity for night driving it may be practically invisible in sunlight. It is suggested that, as a manner of overcoming this possible difficulty, an additional resistance be provided for selective insertion in the direction signal circuit in series with the current interrupter T of Figure 1, and that this resistance be cut in and out of the circuit as a function of the operation of the tail signal control switch. The additional switch for this purpose should be operatively connected to the tail signal control switch in such a manner that the additional resistance is out of the direction signal circuit when the tail switch is open and in the circuit when the tail switch is closed, as will be readily understood by those skilled in the art.

Certain points concerning the operation of the device should be noted. During periods of good visibility the driver will normally operate the vehicle with the brake and tail switches in open circuit position. If, under these conditions, he desires to indicate a direction signal, he will actuate the handle 24, say for example to the right. This will cause current to flow through elements B, T, 6, 13, 7 to the filament 27 to intermittently energize the latter. When the operator's hand is removed from the handle 24, the tension of the spring element 8 through its extension portion 18 acts to return the handle to its "neutral position."

No "reference light" is necessary during periods of good visibility, as the structure of the vehicle itself serves as a "reference" for the flashing light. When the outlines of the vehicle can be seen the position of a flashing light thereon is instantly "located" to an observer.

Suppose now the direction signal control switch to be in neutral. Closing of the tail switch causes current to flow through elements B, tail switch, R, 9, 14, 15, 8, 10 to filaments 25 and 28, and both these filaments will be constantly energized at tail light signal intensity. Closing of the brake switch now will in effect short circuit the tail switch and its series resistance, and the filaments 25 and 28 will be constantly energized at stop light signal intensity. It will thus be seen that when the brake switch is closed it is immaterial as to whether or not the tail switch is closed insofar as its effect on the signal lights is concerned. Opening of the brake switch of course returns control to the tail switch.

Now assume that while the tail switch is closed, the brake switch open, and the filaments 25 and 28 constantly energized at tail light signal intensity, the operator actuates the handle 24 to the left. This will cause current to flow through elements B, T, 12, 16, 11 to the filament 26 which will be intermittently energized. However, since the elements 8 and 14 are still in contacting relation, current will continue to flow through elements B, tail switch, R, 9, 14, 8 to filament 28 which will remain constantly energized at tail light signal intensity. When the actuator 20 moved the extension portion 19 to the right to bring the elements 11 and 16 into contacting relation, it also broke the contact between the elements 10 and 15. This resulted in a de-energization of the filament 25 which had previously been energized along with the filament 28 at tail light signal intensity. Thus it will be seen that the intermittent energization of a filament results in a de-energization (or prevents the energization, as the case may be) of the other filament in the same pair therewith, without in any way affecting the operative status of the stop-tail signal filament in the other pair.

If the brake switch be closed under the above conditions, the intensity of illumination of the filament 28 will be increased to stop light signal intensity without affecting the condition of the remaining filaments. It will now be seen that the sequence of operation of the three circuit controls does not in any way affect the final status of the light sources.

It may be found desirable to place the direction signal control switch assembly at some point not within convenient reach of the vehicle operator, say for example near the lower end of the vehicle steering column. In this case the handle 24 and the lever 23 would be omitted, and a control rod affixed to the pivot 22 at right angles to the plane in which the lever 21 moves. This control rod would then be extended up through the steering column and could be rotated by the vehicle operator by means of a control handle attached thereto at its upper extremity. Or the elements 20 thru 24 could be replaced by a reciprocating cam for actuating the portions 18 and 19, this cam being controlled by a rod placed within the steering column as above. Of course, the entire direction signal switch assembly could advantageously be placed, if desired, within the hub of the vehicle steering wheel, the elements 20 thru 24 probably being omitted, and the portions 18 and 19 actuated by a lever mechanism having an axis of rotation near the central portion of the conventional horn button assembly.

Having thus described my invention, I claim:

1. A signal system on a vehicle equipped with turning and braking means including a pair of double-filament signal lights mounted on relatively opposite sides of the said vehicle and visible from the rear thereof; a tail signal control switch and a resistance in series therewith; a two-terminal brake pedal operated switch connected in parallel electrical relation with the said tail signal control switch and its series resistance; a third switch consisting in part of seven switch elements designed to have a plurality of contacting relations; manually controlled means for selectively effecting the said contacting relations; circuit connections between four of the said switch elements, respectively, and the four filaments of the said signal lights; a circuit connection between another of the said switch elements and one terminal of the said brake pedal operated switch; circuit connections between the two remaining switch elements and one terminal of a two-terminal current interrupter; means for electrically connecting the remaining terminal of both the said brake pedal operated switch and the said current interrupter to a source of current; and ground connections to the said filaments and to the said source of current.

2. In a vehicle signalling system; a pair of double filament signal lights mounted on relatively opposite sides of the vehicle and visible from the rear thereof, each including a stop-tail signal filament and a direction signal filament; a tail signal control means including a switch and a series resistance; a normally open brake pedal operated switch connected in parallel electrical relation with the said tail switch and its series resistance; a third switch having a neutral position and two operative positions; means including a source of current, responsive to the closing of said first mentioned switch when said second mentioned switch is in open circuit position and said third mentioned switch is in neutral position to constantly energize the stop-tail signal filament in each of the two said signal lights at tail light signal intensity; means responsive to the closing of said second mentioned switch while said third mentioned switch remains in neutral position to constantly energize the stop-tail signal filament in each of the two said signal lights at stop light signal intensity; and means, including a current interrupter, responsive to the closing of said third mentioned switch in either operative position while said second mentioned switch remains closed to intermittently energize the direction signal filament in one of the said signal lights as the stop-tail signal filament in the other signal light remains constantly energized at stop light signal intensity; the last three mentioned means having elements in common.

3. In a vehicle signalling system; a pair of double-filament signal lights mounted on opposite sides at the rear of the vehicle each including a stop-tail signal filament and a direction signal filament; means, including a source of current and a resistance, for selectively constantly energizing the stop-tail filament in each of the said lights as a stop signal and as a tail signal; and means for intermittently energizing the direction signal filament in one of the said lights as a direction signal while the other light contains a constantly energized stop-tail filament; both of said means having elements in common.

4. In a vehicle signalling system; a current source; a pair of double-filament signal lights mounted on relatively opposite sides of the said vehicle and visible from the rear thereof, each signal light containing a stop-tail signal filament and a direction signal filament; a circuit including a brake pedal operated switch and a direction signal control switch having a neutral position and manually operable selectively to two direction signalling positions connecting said current source to both said stop-tail signal filaments when said brake pedal switch is closed and said direction signal switch is in neutral position to constantly energize both said filaments at stop light signal intensity; a tail signal control switch and a series resistance connected in parallel electrical relation with the said brake pedal operated switch for connecting the said current source to both said stop-tail signal filaments when said brake pedal switch is in open circuit position, said tail signal switch is closed, and said direction signal switch is in neutral position to constantly energize both said stop-tail signal filaments at tail light signal intensity; and an additional circuit including said direction signal control switch and a current interrupter for connecting said current source to one of the said direction signal filaments upon selective manual operation of said direction signal control switch to one of its direction signalling positions to intermittently energize said direction signal filament.

5. A system according to claim 4 in which the intermittent energization of a direction signal filament prevents the constant energization of the stop-tail signal filament in the same light therewith upon selective closing of the brake pedal operated switch and the tail light switch.

6. In a signalling system for automotive vehicles; a plurality of electric filaments in groups, each group including a stop-tail signal filament and a direction signal filament; a tail signal control means including a switch and a series resistance; a normally open brake pedal operated switch connected in parallel electrical relation with the said tail switch and its series resistance; a third switch having a neutral position and two operative positions; means, including a source of current, responsive to the closing of said second switch when said third switch is in neutral position to constantly energize the stop-tail filament in each of the said groups; and means, including a current interrupter, responsive to the closing of said third switch in either operative position to intermittently energize the direction signal filament in certain of the said groups as the remainder of the said groups continue to have a stop-tail filament constantly energized; the last two named means having elements in common.

7. In a vehicle signalling system; a pair of double-filament signal lights mounted on relatively opposite sides of the vehicle and visible from the rear thereof, each including a stop-tail signal filament and a direction signal filament; a tail signal control means including a switch and a series resistance; a normally open brake pedal operated switch conencted in parallel electrical relation with the said tail switch and its series resistance; a third switch having a neutral position and two operative positions; means, including a source of current and a current interrupter, responsive to the selective closing of said third switch in either operative position while said first and second mentioned switches are in open circuit position to intermittently energize the direction signal filament in one of the said signal lights as the remainder of the said filaments remain inoperative.

8. In a vehicle signalling system, the combination with a pair of double-filament signal lights mounted on relatively opposite sides of the vehicle and visible from the rear thereof, each including a stop-tail signal filament and a direction signal filament, of means, including a source of current, a tail signal control switch and a series resistance, a normally open brake pedal operated switch connected in parallel electrical relation with the said tail switch and its series resistance, and a third switch having a neutral position and manually operable selectively to two direction signalling positions, whereby closing of said first mentioned switch while said second mentioned switch is in open circuit position and said third switch is in neutral position will constantly energize the stop-tail signal filament in each of the two said signal lights at tail light signal intensity; and further means, including a current interrupter, whereby closing of said third switch in either direction signalling position while said first mentioned switch remains closed and said second mentioned switch remains open will intermittently energize the direction signal filament in one of the said signal lights as the stop-tail filament in the other light remains constantly energized at tail light signal intensity.

9. In a vehicle signalling system, the combination with a pair of double-filament signal lights mounted on relatively opposite sides of the vehicle and visible from the rear thereof, each including a stop-tail signal filament and a direction signal filament, of means, including a source of current, a tail signal control switch and a series resistance, a normally open brake pedal operated switch connected in parallel electrical relation with the said tail switch and its series resistance, and a third switch having a neutral position and manually operable selectively to two direction signalling positions, whereby closing of said second mentioned switch when said third switch is in neutral position will constantly energize the stop-tail signal filament in each of the two said signal lights at stop light signal intensity; and further means, including a current interrupter, whereby closing of said third switch in either direction signalling position while said second mentioned switch remains closed will intermittently energize the direction signal filament in one of the said signal lights as the stop-tail signal filament in the other light remains constantly energized at stop light signal intensity.

10. In an electrical system for vehicles equipped with turning and braking means, two pairs of electric filaments, one pair located on each side of the vehicle and visible when energized from the rear thereof, each pair consisting of a stop-tail signal filament and a direction signal filament; means, including a source of current, a normally open brake pedal operated switch, and a direction signal control switch having a neutral position and manually operable selectively to two direction signalling positions, responsive to the closing of said first mentioned switch when said second mentioned switch is in neutral position to constantly energize the stop-tail signal filament in each of the said pairs at stop light signal intensity; further means, including the said source of current, the said direction signal control switch and a current interrupter, responsive to the selective closing of the said second mentioned switch in either direction signalling position while said first mentioned switch remains closed to intermittently energize the direction signal filament in one of the said pairs while the stop-tail signal filament in the other pair remains constantly energized at stop light signal intensity; a tail signal control switch and a series resistance connected in parallel electrical relation with the said brake pedal operated switch and effectively operable when said brake pedal operated switch is in open circuit position for reducing the strength of the current that would normally be supplied when said brake switch is closed to one or both of the said stop-tail signal filaments according to the circuit status of the said direction signal control switch.

HOWARD J. MURRAY, JR.